US010591353B2

(12) United States Patent
Caucci et al.

(10) Patent No.: US 10,591,353 B2
(45) Date of Patent: Mar. 17, 2020

(54) SYNTHETIC IMAGING SYSTEMS USING ALGORITHMS OR MATHEMATICAL TRANSFORMATIONS SIMULATE OPTICAL EFFECTS OF OPTICAL COMPONENTS

(71) Applicant: Arizona Board of Regents on behalf of The University of Arizona, Tucson, AZ (US)

(72) Inventors: Luca Caucci, Tucson, AZ (US); Harrison Barrett, Tucson, AZ (US)

(73) Assignee: Arizona Board of Regents on behalf of The University of Arizona, Tucson, AZ (US)

( * ) Notice: Subject to any disclaimer, the term of this patent is extended or adjusted under 35 U.S.C. 154(b) by 0 days.

(21) Appl. No.: 16/271,829

(22) Filed: Feb. 10, 2019

(65) Prior Publication Data

US 2019/0170575 A1    Jun. 6, 2019

Related U.S. Application Data

(63) Continuation-in-part of application No. 15/494,351, filed on Apr. 21, 2017, now Pat. No. 10,228,279.

(60) Provisional application No. 62/325,896, filed on Apr. 21, 2016.

(51) Int. Cl.
    *G01J 1/04*      (2006.01)
    *G01J 1/44*      (2006.01)
    *G02B 27/09*     (2006.01)

(52) U.S. Cl.
    CPC .............. *G01J 1/44* (2013.01); *G01J 1/0437* (2013.01); *G02B 27/0961* (2013.01); *G01J 2001/444* (2013.01); *G01J 2001/448* (2013.01)

(58) Field of Classification Search
    CPC ...... G01J 1/0437; G01J 1/0407; G01J 1/0411; G01J 2001/448; G02B 27/0961; G06T 5/50
    USPC ........................................ 250/208.1, 214 R
    See application file for complete search history.

(56) References Cited

U.S. PATENT DOCUMENTS

| 5,757,005 | A  | * | 5/1998 | Callas ................... G01T 1/2928 |
|           |    |   |        | 250/363.06                              |
| 6,392,235 | B1 |   | 5/2002 | Barrett et al.                          |
| 8,841,625 | B2 |   | 9/2014 | Yamatani                                |

OTHER PUBLICATIONS

Clarkson et al. "Proceedings of SPIE: Synthetic collimator for 2D and 3D imaging," Medical Imaging '99, 1999, San Diego, CA, United States, 12 pp.

(Continued)

*Primary Examiner* — Que Tan Le
(74) *Attorney, Agent, or Firm* — Leydig, Voit & Mayer, Ltd.

(57) ABSTRACT

The present invention provides methods and systems for manipulating radiance data obtained from a radiance sensor that includes a lenslet array and a photodetector array, where the manipulation of the radiance data uses one or more algorithms or mathematical transformations applied by a software program. Manipulating the measured radiance data computationally produces the same optical effects of a desired optical system without having to insert the optical system into the optical path of the electromagnetic radiation. The manipulated radiance data is then used to generate an image.

13 Claims, 5 Drawing Sheets

(56) References Cited

OTHER PUBLICATIONS

Wilson et al., "Reconstruction of Two- and Three-Dimensional Images from Synthetic-Collimator Data," IEEE Transactions on Medical Imaging, vol. 19, No. 5, May 2000, 11 pp.

* cited by examiner

SYNTHETIC IMAGING SYSTEMS USING ALGORITHMS OR MATHEMATICAL TRANSFORMATIONS SIMULATE OPTICAL EFFECTS OF OPTICAL COMPONENTS

CROSS-REFERENCE TO RELATED APPLICATIONS

This application claims priority to U.S. application Ser. No. 15/494,351 filed Apr. 21, 2017, and U.S. Provisional Application No. 62/325,896 filed Apr. 21, 2016, both of which are incorporated by reference in their entirety.

STATEMENT REGARDING FEDERALLY SPONSERED RESEARCH OR DEVELOPMENT

This invention was made with government support under Grant No. R01EB000803 awarded by NIH. The government has certain rights in the invention.

BACKGROUND

The present invention relates to the field of computational imaging with a radiance sensor that includes a lenslet array and a photodetector array.

SUMMARY OF THE EMBODIMENTS

Embodiments of the present invention provide methods and systems for manipulating radiance data from electromagnetic radiation using a synthetic pupil mask (which also may be referred to as a synthetic optical system or synthetic phase mask). Manipulating the measured radiance data computationally simulates the same optical effects of a desired optical system without having to actually to insert the optical system into the optical path of the electromagnetic radiation. The manipulated radiance data is then used to generate an image.

As used herein, a "synthetic pupil mask", "synthetic phase mask" and "synthetic optical system" refer to one or more algorithms or mathematical transformations applied, preferably by a software program, to radiance data obtained from electromagnetic radiation, where the algorithms or mathematical transformations simulate the behavior of selected optical components or optical instruments on the electromagnetic radiation to achieve one or more desired optical effects.

In an embodiment, the present invention provides a method for generating an image from electromagnetic radiation transmitted through a lenslet array and detected by a photodetector array in a detector plane, comprising:
  measuring radiance data of the electromagnetic radiation in the detector plane from a plurality of electrical signals, each of the plurality of electrical signals having been generated by a respective one of a plurality of photodetectors of the photodetector array in response to a respective one of a plurality of spatial regions of the electromagnetic radiation;
  selecting a desired synthetic pupil mask, where the synthetic pupil mask computationally simulates optical effects of one or more optical components on the electromagnetic radiation;
  manipulating the measured radiance data to simulate the optical effects corresponding to the selected synthetic pupil mask, said manipulation comprising applying one or more algorithms or mathematical transformations to the measured radiance data; and
  generating an image from the manipulated radiance data.

The invention may further comprise a self-calibration procedure comprising the steps of: estimating optical aberrations caused by the lenslet array and/or photodetector array; and applying a computational synthetic corrective element to the measured radiance data before selecting the desired synthetic pupil mask, where the synthetic corrective element reduces or corrects the estimated optical aberrations.

In an embodiment, the present invention provides a system for generating an image of electromagnetic radiation comprising:
  a) a lenslet array;
  b) a photodetector array located in a detector plane, and including a plurality of photodetectors configured to generate a respective one of a plurality of electrical signals output in response to electromagnetic radiation transmitted by the lenslet array and incident on the photodetector array;
  c) memory configured to store non-transitory computer-readable instructions and the plurality of electrical signals;
  d) a microprocessor configured to execute the instructions to: measure radiance data of the electromagnetic radiation in the detector plane from the plurality of electrical signals; apply one or more algorithms or mathematical transformations to the measured radiance data, where said one or more algorithms or mathematical transformations simulates optical effects of one or more optical components on the electromagnetic radiation; and generate an image from the manipulated radiance data.

In a further embodiment, measuring the radiance data comprises determining the irradiance of the electromagnetic radiation in the detector plane from the plurality of electrical signals, and optionally the measured radiance data further comprises 4D-radiance of the electromagnetic radiation in an input plane reconstructed from the determined irradiance.

In an embodiment, the simulated optical effects on the electromagnetic radiation are selected from the group consisting of increasing depth of field, altering magnification, bending of electromagnetic radiation rays, amplitude modulation, sensitivity-function engineering, digital refocusing, aberration correction, aberration reduction, and combinations thereof. In an embodiment, generating the image from the manipulated radiance data uses maximum likelihood estimation, second order optimization, pseudo-inverse operators, positivity-enforcing operators, stochastic optimization, or combinations thereof.

In an embodiment, (A1) denotes a radiance sensor that includes a memory and a microprocessor. The memory stores non-transitory computer-readable instructions and is adapted to store a plurality of electrical signals output from a photodetector array in response to electromagnetic radiation transmitted through a lenslet array and incident on the photodetector array. The microprocessor is adapted to execute the instructions to (i) determine irradiance of the electromagnetic radiation in a detector plane from the plurality of electrical signals, each electrical signal having generated by a respective one of a plurality of photodetectors of the photodetector array, and (ii) reconstruct, from the determined irradiance, the 4D-radiance in an input plane, the lenslet array being between the input plane and the detector plane.

(A2) The radiance sensor denoted by (A1) may further include the lenslet array, the photodetector array being located behind the lenslet array in a plane substantially parallel to a plane of the lenslet array.

(A3) In any radiance sensor denoted by one of (A1) and (A2), the lenslet array may have a plurality of lenslets of focal length f, the photodetector array being located a distance $q \geq f$ behind the lenslet array.

(A4) In any radiance sensor denoted by one of (A1) through (A3), the microprocessor may be further configured to, when executing the instructions to manipulate data corresponding to the determined radiance data, apply a pseudoinverse operator to data corresponding to the determined irradiance.

"(B1)" denotes a method for reconstructing 4D-radiance of electromagnetic radiation transmitted through a lenslet array and detected by a photodetector array in a detector plane. The method denoted (B1) includes a step of determining irradiance of the electromagnetic radiation in the detector plane from a plurality of electrical signals. Each of the plurality of electrical signals may be generated by a respective one of a plurality of photodetectors of the photodetector array in response to a respective one of a plurality of spatial regions of the electromagnetic radiation. The method includes a step of reconstructing, from the determined irradiance, the 4D-radiance in an input plane, the lenslet array being between the input plane and the detector plane.

(B2) The method denoted (B1) may further include a step of generating each of the plurality of electrical signals by detecting the electromagnetic radiation with the photodetector array.

(B3) In any method denoted by one of (B1) and (B2), the lenslet array having a plurality of lenslets of focal length f, the photodetector array being located a distance $q \geq f$ behind the lenslet array.

(B4) In any method denoted by one of (B1) through (B3), the step of generating the image may include applying a pseudoinverse operator to the determined irradiance.

DETAILED DESCRIPTION OF THE EMBODIMENTS

Figure 1:
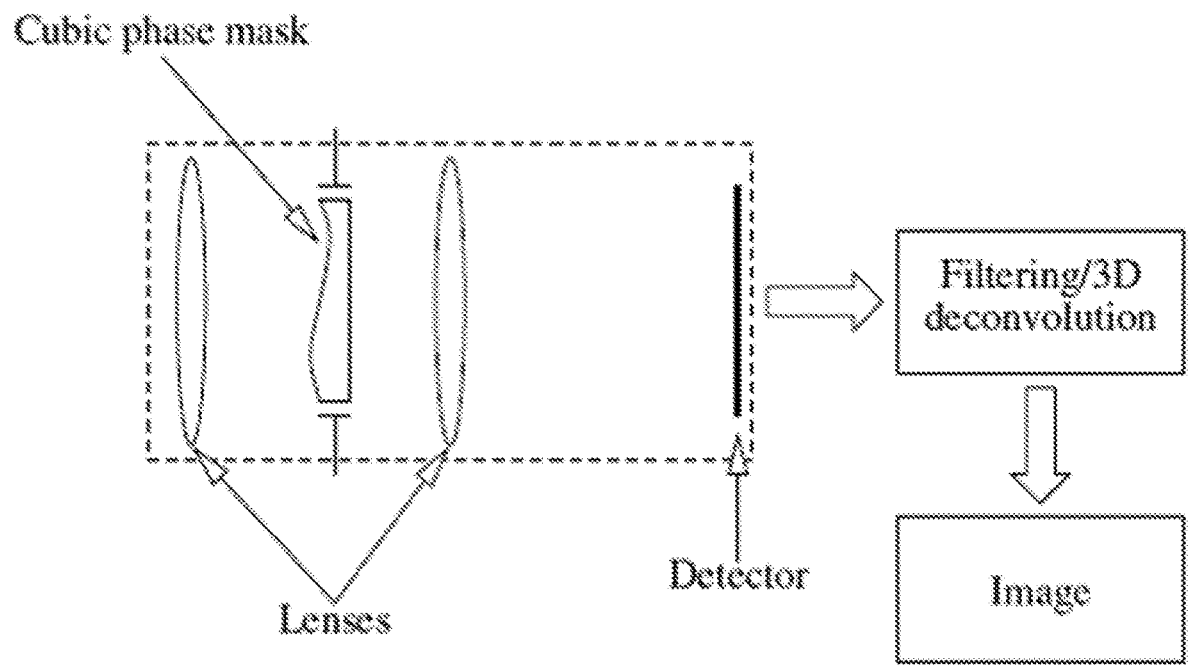
FIG. 1 is a schematic illustration of a conventional optical instrument having a cubic phase mask in communication with one or more computing devices. The cubic phase mask is an actual optical component that needs to be fabricated and properly aligned within the optical system.

A common method for extending the depth of field of an optical instrument (such as a microscope) uses a cubic phase mask placed between the objective lens and the detector, as illustrated in FIG. 1. A cubic phase mask refers to a physical optical component designed and precision-machined to exert a fixed position-dependent shift in the phase of an incoming wavefront. This technique falls under the category of wavefront coding. The data collected by the sensor must then be processed (typically via a least mean square error filter or 3D deconvolution) to produce an image having a large depth of field.

The technique briefly outlined above has many practical limitations. Assembly requires burdensome alignment and testing. Another major drawback is that, once fabricated, the phase mask cannot be altered or easily replaced. A fixed phase mask also implies fixed performance, with no option for the final user to tune the system and achieve a desired trade-off between resolution, minimum depth of field, magnification, etc. Such drawbacks ultimately translate into increased cost and limited capabilities. Further, some operations related to imaging and image processing cannot be performed with a phase mask.

To solve at least the limitations outlined above, and to provide a flexible solution to the problem of extending the depth of field in digital microscopy, embodiments of the present disclosure augment the capabilities of digital optical instruments (e.g., cameras, microscopes, telescopes, medical endoscopes, etc.) to measure a 4D radiance function. Samples of the radiance function (which quantifies the amount of light traveling at some point in a specified direction, per unit projected area perpendicular to the direction of travel, per unit solid angle) are further processed by software, e.g., via synthetic mask, to mimic the behavior of selected optical components (e.g., lenses, filters, mirrors, masks, apertures, stops, etc.) or optical instruments (e.g., microscopes, telescopes, medical endoscopes, etc.). In certain embodiments, the selected optical component being mimicked is a phase mask such as a cubic phase mask. The synthetic mask may mimic an optical component in the pupil plane of the optical system.

In another aspect, manipulation of radiance data allows a great amount of flexibility in the properties of the optical instrument being considered. For example, there is no limit on the type of optical component or optical system being simulated and any optical component or optical system may be selected for application to the measured radiance data.

Figure 2:
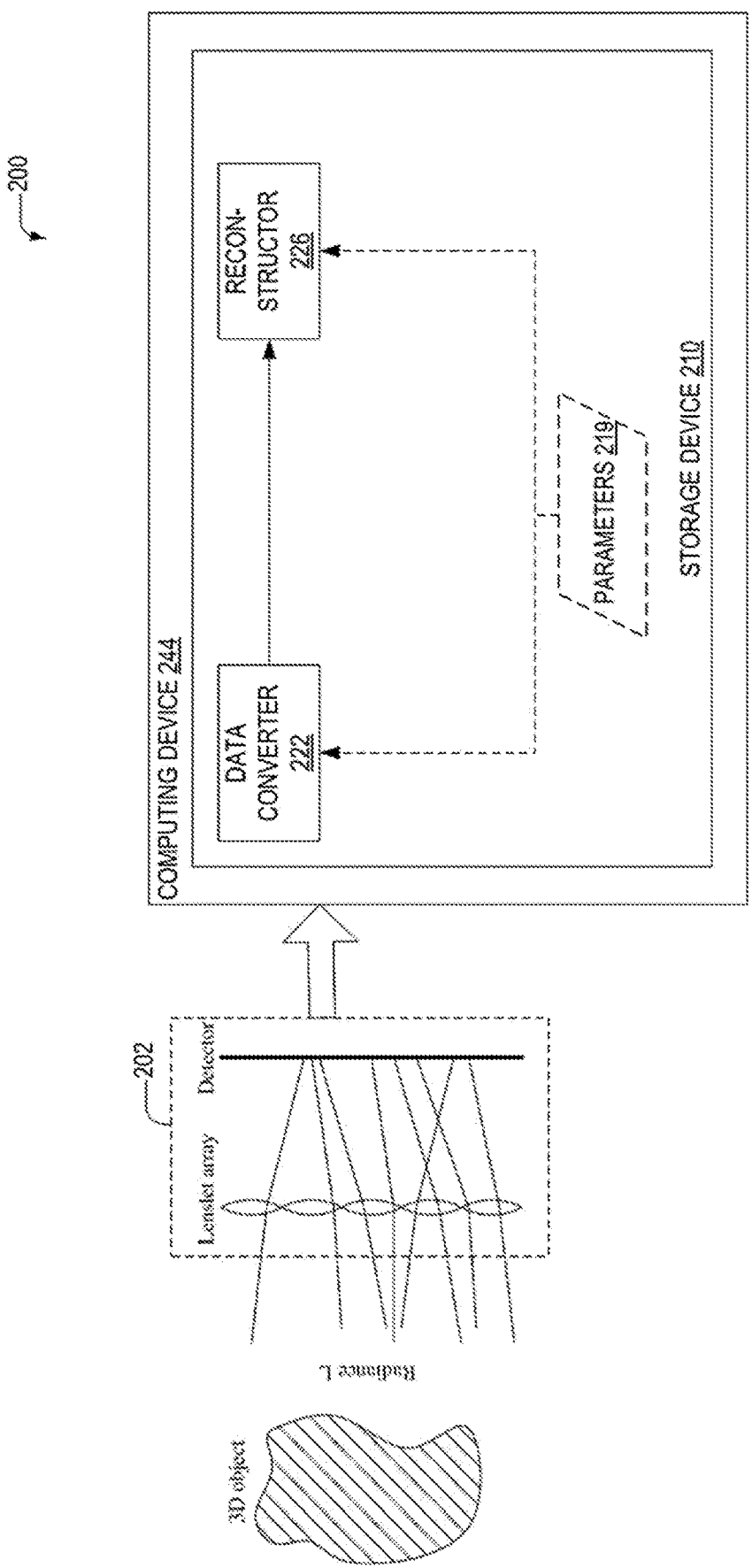
FIG. 2 illustrates an embodiment of a system for software-controlled synthetic mask via radiance function measurement, in an embodiment.

FIG. 2 illustrates an embodiment of a system 200 for software-controlled synthetic mask via radiance function measurement, in an embodiment. The system 200 includes an optics unit 202 in communication with at least one computing device 244 (e.g. a processor, or image processor) including one or more data storage devices 210, e.g., via a network. In certain embodiments, computing device 244 may be integrated with the optics unit 202 and/or data storage device 210.

The optics unit 202 includes a detector and a lenslet array. Optics unit 202 may also include an imaging lens, such that the lenslet array is between the imaging lens and the detector. Examples of the optics unit 202 include, but are not limited to, cameras, microscopes, telescopes, and medical endoscopes, a radiance camera, and a plenoptic camera such as a light-field camera. In operation, light received from a sample (not shown) is gathered by the optical components and focused on the area of the detector. In one embodiment, the light may be any wavelength (infrared, visible, ultraviolet, etc.).

Data converter 222 determines irradiance of light incident on optics unit 202. To determine the irradiance, data converter 222 may employ parameters 219 of optics unit 202. Data converter 222 may include computer readable instructions that when executed by a processor (e.g. computing device 244) operate to process electrical signals generated by optics unit 202 (such as electrical signals generated by the detector of optics unit 202). Processing output of data converter, via reconstructor 226, may then occur to generate an image (e.g., iterative reconstruction via pseudo-inverse and positivity enforcing operators, stochastic optimization, etc.). Reconstructor 226 may reconstruct radiance data from the irradiance determined by data converter 222, and optionally also from parameters 219. Reconstructor 226 may include computer readable instructions that when executed by a processor (e.g. computing device 244) operate to process manipulated radiance/irradiance data from data converter 222 to reconstruct the radiance data.

A synthetic pupil mask may simulate the behavior of selected optical components (e.g., lenses, filters, mirrors, masks, apertures, stops, etc.) or optical instruments (e.g., microscopes, telescopes, etc.) to achieve one or more desired optical effects ("set parameters"). Examples of such optical effects include, but are not limited to, depth of field, magnification, control or reduction of aberrations (e.g., astigmatism, spherical aberrations, etc.), amplitude modulation, synthetic lens system, sensitivity function engineering, and digital refocusing, as discussed below. In certain embodiments, the selected optical component being mimicked is a phase mask such as a cubic phase mask. In this case, the synthetic pupil mask simulates the effect that would be achieved if a perfect phase mask were inserted within the path of the light. Processing of the radiance function data is discussed in further detail below.

In an embodiment, a method includes one or more computational steps that apply a mathematical transformation to radiance data (e.g., collected by the radiance-measuring apparatus) to obtain different effects or results. These computational steps may be performed within the computing device of FIG. 2. Examples of such effects or results (and the computational steps to achieve said results) may include, but are not limited to:

(a) Extended depth of field (e.g., a synthetic mask that exerts the same phase shift that a physical cubic phase mask would exert in the incoming wavefront)

(b) Synthetic lens system (e.g., a lens system is made up of one or more lenses that bend the light in a certain way). This may be performed algorithmically and diffraction-free assuming the radiance data is provided);

(c) Amplitude modulation (e.g., apply a position-dependent reduction of the light irradiance (or stop the light completely) as light passes through an optical systems. Similar to apodization or dark-field microscopy).

(d) Sensitivity-function engineering (e.g., synthetic collimator (i.e., thin cylindrical sensitivity function)).

(e) Digital refocusing.

(f) Aberration correction/reduction (e.g., cancellation or reduction of aberration of an optical system); and (g) System self-calibration. As discussed below, in certain embodiments, the radiance measurement apparatus does not apply any synthetic mask to the radiance data so that it estimates its own aberrations (due to imperfect lenses, misalignments, etc.). Subsequently, a synthetic mask is generated and applied to correct those aberrations. This synthetic mask may be saved to disk and applied every time an actual object is imaged.

(h) Optical testing (i.e., place an optical element to be tested between a known light source and the radiance camera. Use the radiance data to perform maximum-likelihood estimation of parameters characterizing the element being tested.). An example of maximum-likelihood estimation is illustrated in U.S. Pat. No. 9,182, 289, which is incorporated by reference herein in its entirety.

Embodiments of the computing device 244 may be independently performed any computing device such as desktop computers, laptop computers, mobile phones, tablet computers, set top boxes, entertainment consoles, server computers, client computers, and the like. In certain embodiments, the computing device may further include at least one of a field programmable gate array (FPGA) and a graphics processing unit (GPU).

While FPGAs can be very fast, especially for well-defined digital signal processing usages (e.g. radar data), FPGAs are quite cumbersome to program. GPUs have emerged that are nearing parity with FPGAs in both performance and power consumption. Unlike FPGAs, GPUs excel in floating-point operations and this capacity makes GPUs a natural fit for floating-point-intensive signal- and image-processing applications. Moreover, GPUs are designed with very fast memory, and new direct memory access (DMA) techniques allow high-volume sensor data to be streamed to the GPU without consuming GPU clock cycles. GPUs also offer good backward compatibility. If an algorithm changes, the new software can run on older chips. FPGAs are more problematic on this count: It's no small matter to upgrade the algorithm on an FPGA or to move an algorithm to a newer FPGA.

To provide for interaction with a user, the computing device may employ any form of sensory feedback (e.g., visual feedback, auditory feedback, or tactile feedback) to communicate with a user. Input from the user may, for example, be received in any form, including acoustic, speech, and/or tactile input. For example, the computing device may further include one or more electronic display devices alone or in combination with one or more user input devices. Examples of electronic displays may include, but are not limited to, cathode ray tube displays (CRTs), liquid crystal displays (LCD), light emitting diode displays (LEDs), touch-sensitive displays, and the like. Examples of user input devices include, but are not limited to, keyboards, pointing devices such as a mouse or a trackball, voice recognition, gesture recognition, etc. Accordingly, interactions between a user and the computing device 102 may include display of information to the user via one or more electronic displays and receipt of input from the user via one or more of the user input devices.

Embodiments of the data storage device may include one or more data storage device capable of maintaining computer-readable data. Examples may include, but are not limited to, magnetic storage (e.g., tape, hard disk drives, etc.), solid state storage (e.g., flash memory, etc.), and other computer-readable media known in the art.

Embodiments of the network may include, but are not limited to, packet or circuit-based networks. Examples of packet based networks may include, but are not limited to, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Examples of circuit-based networks may include, but are not limited to, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Figure 3:
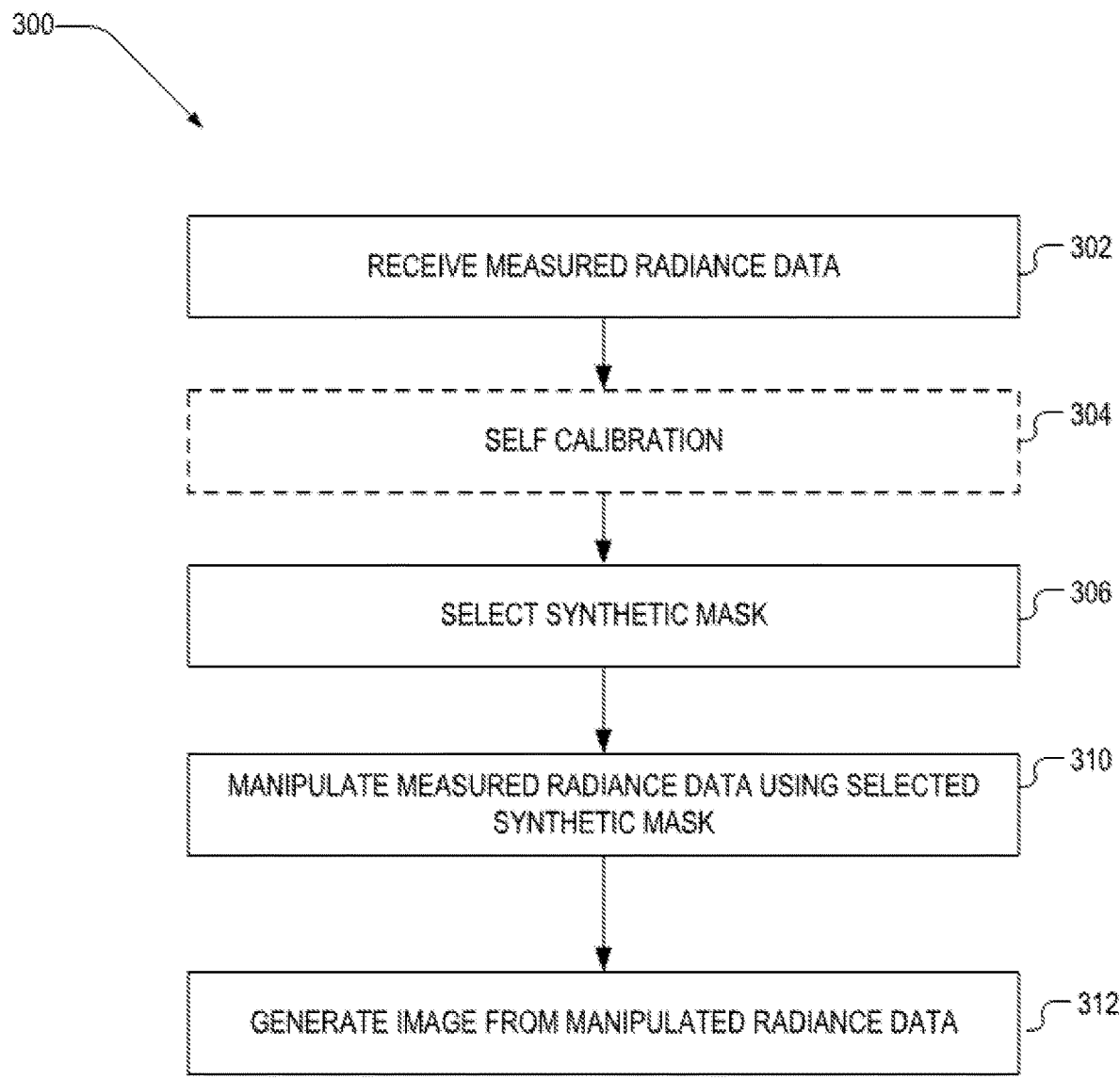
FIG. 3 is a flowchart illustrating a method for manipulating measured radiance data, in an embodiment.

FIG. 3 illustrates an embodiment of a method 300 for manipulating measured radiance data to simulate a 3-D optical system. It may be understood that, in alternative embodiments, one or more of the operations of FIG. 3 may be omitted or performed in a different order than illustrated.

In operation 302, measured radiance data is received by one or more processors of a computing device. The measured radiance data may be received from the detector itself or retrieved from a data storage device.

In operation 304, a self-calibration procedure is optionally performed. As part of the system calibration procedure, a "synthetic corrective element" may be calculated and applied to the output of the radiance camera before any other processing takes place. For example, a known light source (e.g., a beam of collimated light) may be placed in front of the optics unit 202. Design specifications tell what the expected radiance output should look like. Small deviations may be estimated and corrected by applying the synthetic corrective element to the measured radiance data.

In operation 306, a synthetic pupil mask is selected. As discussed above, in one embodiment, the synthetic pupil mask may be selected to simulate the behavior of selected optical components (e.g., lenses, filters, mirrors, masks, apertures, stops, etc.) or optical instruments (e.g., microscopes, telescopes, etc.) to achieve one or more desired optical effects. Examples of such optical effects include, but are not limited to, depth of field, magnification, control or reduction of aberrations (e.g., astigmatism, spherical aberrations, etc.), amplitude modulation, synthetic lens system, sensitivity function engineering, and digital refocusing.

In operation 310, the measured radiance data is manipulated using the selected synthetic data mask. The premise of this operation is that the optics unit 202 (such as a plenoptic camera) delivers measurements of the radiance function $L(r, \hat{s})$, which represents the amount of light travelling along direction $\hat{s}$ and passing through the point r (this point may be specified by three numbers in the general case, or by two numbers given a fixed reference plane/surface). In other words, the radiance function defines a set of rays along which light propagates. The synthetic pupil mask is applied to the rays by calculating refraction of the rays at the entrance and exit of the synthetic pupil mask.

In operation 312, an image is generated from the manipulated radiance data. In an embodiment, the image is generated using algorithms based on maximum likelihood estimation. These algorithms have a higher computational cost when compared to 3D deconvolution, but they have the advantage that accurate noise models may be accounted for. The speed of convergence of these algorithms may be improved by enforcing non-negativity of the reconstructed image at each iteration.

In summary, embodiments of the present disclosure present a radically new idea in which radiance function measurements may be manipulated via a software program to get the same effect one would get if an arbitrary optical system were inserted in the optical path. The unique strengths of the technology may thus be summarized as follows:

(a) Mathematical transformations associated with the synthesized optical system may be calculated on-the-fly and applied to radiance data.

(b) No need for high-precision fabrication and alignment of optical elements.

(c) Software-controlled system reconfiguration such as changing depth of field, changing magnification, and control or reduction of aberrations (e.g., astigmatism, spherical aberrations, etc.), amplitude modulation, synthetic lens system, sensitivity function engineering, and digital refocusing.

(d) Algorithmic self-calibration by use of a known illumination pattern to estimate parameters of the optical system or joint reconstruction/estimation of object and system parameters.

(e) Data processing via GPUs:
  a. Advanced reconstruction algorithms (maximum-likelihood, second order optimization, positivity-enforcing operators, stochastic optimization, etc.).
  b. Off-line processing of radiance data by storage to disk.
  c. System easy to update with new algorithms.

Beneficially, the disclosed embodiments may be employed to extend the depth of field of a conventional digital microscope by augmenting the microscope design to allow direct measurements of the radiance function (which quantifies the amount of light traveling at some point in a specified direction, per unit area perpendicular to the direction of travel, per unit solid angle). Processing of radiance data with graphics processing unit (GPU) technology (e.g. computing device 244) will allow high throughput and flexibility (e.g., use a variety of algorithms to get images that relies on different imaging techniques) and a wide range of applications, not just extended depth of field. A benefit of this approach is that no expensive optical elements will have to be fabricated and aligned, as their effect on light entering the microscope may be obtained by manipulating the measured radiance data with a computer program.

Beyond Phase Plates: Operations Away from a Pupil Plane

One application of light-field imaging (e.g., with plenoptic cameras) is extending the depth of focus of an image or providing the ability to refocus on a different plane after capturing an image. These are operations that may be achieved by modifying the complex transmission of the pupil of the system, either in hardware or software. The class of operations that may be achieved is the same as those that may be realized with a thin hologram in a pupil plane. By contrast, embodiments disclosed herein enable operations equivalent to volume holograms at arbitrary planes in the system. Moreover, it enables arbitrary nonlinear operations on the radiance domain.

High-Fidelity Radiance Sensor

1. Definition and Notation

Radiance is a familiar and important concept in optical engineering; it describes the radiant flux in an optical system as a function of 3D spatial position and ray direction. The SI unit of radiance is the watt per steradian per square meter ($W \cdot sr^{-1} \cdot m^{-2}$). Radiance is useful because it indicates the radiant flux emitted, reflected, transmitted, or received by a surface, per unit solid angle per unit projected area. Hence, radiance is a directional quantity.

Given the radiance throughout a system, other familiar radiometric quantities may readily be computed. For example, the irradiance (in units of power per unit area, $W \cdot m^{-2}$) received at a plane is given by the integral of the radiance over all the directions defined by a hemisphere centered on the normal to the plane. On the other hand, radiant exitance (still measured in $W \cdot m^{-2}$) measures the radiant flux emitted by a plane per unit area.

A high-fidelity radiance sensor includes array of very small lenslets in close proximity to an optical image sensor with a very large number of pixels. For example, Holographix makes lenslet arrays with 15 µm pitch and 105-µm focal length, and Canon makes a 120 Mp (Megapixel) CMOS sensor with 2.2-µm pixels. The lenslet array is placed a distance q in front of the sensor, where $q \geq f$, with f being the focal length of the lenslets, and the irradiance on the optical sensor is recorded.

The most general application of a high-fidelity radiance sensor is to replace optical fabrication and testing with programming. Suppose one wants to build a complicated optical system for imaging or information extraction, and that there are numerous design tradeoffs to be made. It is possible to simply choose an arbitrary plane through the system, insert a high-fidelity radiance sensor in this plane, and ignore all components of the system "downstream" from this plane and all of the associated design tradeoffs. Then one may simulate the missing pieces and compute either the radiance functions elsewhere in the system or the output of some optical detector that would have been part of the real system. All of the missing components may be simulated, either once to select a set of design parameters for a particular input object or light source, multiple times for many different objects, or dynamically as the object evolves in time. As a side benefit, there is no need to include diffraction or vignetting in the synthetic part of the imaging system; the downstream components may have arbitrarily high spatial resolution and throughput.

Some embodiments of a high-fidelity radiance sensor differ from plenoptic or light-field camera because there is no objective lens. Instead, the goal is to use the recorded irradiance on the optical sensor in an inverse problem that will yield the radiance in the entrance face of the lenslet array.

This is a challenging inverse problem because radiance on a plane is a function of five variables: position coordinates x and y, two direction cosines $s_x$ and $s_y$, and a spectral variable, e.g., wavelength $\lambda$ or frequency v. To simplify the problem for clarity of illustration herein, it may be assumed that the radiation is quasi-monochromatic so the spectrum is of no interest, but a function of four continuous variables is desirable from data that depend on two discrete variables, the indices $m_x$ and $m_y$, that specify the location of a pixel on the optical sensor. System 200 may be used as a high-fidelity radiance sensor if the inverse problem allows an estimate of the spatial variation of the radiance on the face of the lenslet array to a precision comparable to the pitch d of the lenslets while also estimating the angular dependence of the radiance to a precision of order d/q.

With the notation in Caucci et al. (Optical Engineering 2015, doi:10.1117/1.OE.55.1.013102, hereafter "OE15"), the radiance at a plane P is denoted $L^P(r, s_\perp)$, where r and $s_\perp$ are 2D vectors (see OE15). Specifically, an arbitrary point in 3D space may be denoted as $\mathbb{r} \equiv (x, y, z)$. Considering an arbitrary plane that intersects this point, and without loss of generality, take the z-axis perpendicular to this plane. The 2D vector that defines the point is $r \equiv (x, y)$ and $s_\perp \equiv (s_x, s_y)$.

The radiance in any other plane in image space may be found by using the principle of conservation of radiance along a ray (again, see OE15). Conversely, to measure the radiance at any downstream plane in a lossless system, the conservation law obtains the radiance at plane P itself, such that it may be assumed that the radiance is measured directly in plane P.

Since these notes concern diffraction limits, a physical-optics definition of radiance may be used. In 1968, Adriaan Walther defined the generalized spectral radiance (actually a spectral radiance per unit frequency v) at a point r on plane P by $$L_v^P(r, s_\perp, v) = \tag{1.1}$$

$$\frac{\cos\theta}{\lambda^2} \int_P d^2\Delta r \langle u(r + \tfrac{1}{2}\Delta r) u^*(r - \tfrac{1}{2}\Delta r)\rangle \exp(-i\, k\, s_\perp \cdot \Delta r),$$

where $\theta$ is the angle between $\hat{s}$ and the normal to the plane P; $k=2\pi/\lambda$, $=2\pi v/c$; u(r) is a complex scalar electric field (e.g., one component of the electric field vector); the angle brackets denote a statistical average over an ensemble of scalar fields, and r and $\Delta r$ are 2D position vectors specifying points in the plane. As noted by Walther in 1968, the generalized radiance is closely related to the Wigner distribution function, originally defined in quantum mechanics and now widely used in signal processing. In *Foundations of Image Science*, by H. H. Barrett and K. J. Myer (hereinafter *Foundations*), Walther's generalized radiance is referred to as a stochastic Wigner distribution function.

A remarkable property of the generalized radiance is that it is also conserved along a ray in a lossless system, and this ray is the same ray as defined by geometric optics. This statement is true quite generally, but it is easiest to state with equations relevant to paraxial optics, where the rays are nearly parallel to the optical axis.

For a rotationally symmetric paraxial optical system with the input and output planes parallel to each other and perpendicular to the axis of rotational symmetry, the 4D coordinates of a ray are transformed according to (See Sec. 9.7.3 in *Foundations*):

$$\begin{bmatrix} r^{out} \\ s_\perp^{out} \end{bmatrix} = \begin{bmatrix} A & B \\ C & D \end{bmatrix} \begin{bmatrix} r^{in} \\ s_\perp^{in} \end{bmatrix} = M \begin{bmatrix} r^{in} \\ s_\perp^{in} \end{bmatrix}.$$

Matrix M is referred to as an ABCD matrix. In the case above, M is a 2×2 block matrix in which each submatrix is a 2×2 matrix with scalar elements. Because of rotation symmetry, the submatrices are diagonal:

$$A = \begin{bmatrix} a & 0 \\ 0 & a \end{bmatrix}, B = \begin{bmatrix} b & 0 \\ 0 & b \end{bmatrix}, C = \begin{bmatrix} c & 0 \\ 0 & c \end{bmatrix} \text{ and } D = \begin{bmatrix} d & 0 \\ 0 & d \end{bmatrix}.$$

In a derivation, scalar 2×2 ABCD matrices may be used to perform calculations and tacitly extend them to their 2×2 block matrix equivalent as necessary. Two relevant ABCD matrices are those describing propagation between input and output planes separated by a distance q and another describing the action of an ideal thin lens of focal length f. These matrices are given, respectively, by $$M_q = \begin{bmatrix} 1 & q \\ 0 & 1 \end{bmatrix}, M_{lens} = \begin{bmatrix} 1 & 0 \\ -f^{-1} & 1 \end{bmatrix}.$$

Generalized Diffraction Integral

The Fresnel diffraction integral for a rotationally symmetric optical system was first written in terms of matrix optics by Collins (1970) and further explored by Nazarathy and colleagues (Nazarathy and Shamir, 1982a, 1982b). For textbook treatments, see Saleh and Teich (*Fundamentals of Photonics*, 1991) and Siegman (*Lasers*, 1986).

The main result of these discussions is that, when the mapping from $P_{in}$ to $P_{out}$ is described geometrically by a 2×2 ABCD matrix, the field is mapped in the Fresnel approximation according to $$u^{out}(r) = -\frac{i}{B\lambda}\int_\infty d^2r_0 u^{in}(r_0)\exp\left[\frac{i\pi}{B\lambda}(Ar_0^2 + Dr^2 - 2r\cdot r_0)\right]. \quad (1.2)$$

Transformation of Generalized Radiance Through Paraxial Optical Systems

Friberg (*Appl. Opt.* 30, 2443-2446 (1991)) computed the generalized radiance associated with the output field as given in (1.2). The result is most neatly stated if write $$L_\nu(\mathbf{r}, \hat{s}, \nu) = L\left(\begin{bmatrix} r \\ s_\perp \end{bmatrix}\right), \quad (1.3)$$

where the $\nu$ argument and subscript is dropped, but a spectral radiance is still implied. With this notation, the subscripts may be appended to distinguish the radiances associated with input and output fields for some optical system described by an ABCD matrix denoted M. These radiances are related by $$L^{out}\left(\begin{bmatrix} r \\ s_\perp \end{bmatrix}\right) = L^{in}\left(M^{-1}\begin{bmatrix} r \\ s_\perp \end{bmatrix}\right). \quad (1.4)$$

Thus, the radiance is constant along the ray defined by geometrical optics. The same conclusion was reached by Walther (1978) by a stationary-phase approximation, valid asymptotically in the limit of zero wavelength. Friberg's derivation does not require this limit (though it does use the Fresnel approximation), and it is valid for any state of coherence of the fields. Moreover, since it holds for all $\nu$, (1.4) works for the overall radiance as well as the spectral radiance.

2. Analysis of the High-Fidelity Radiance Sensor

Ultimately, 2D irradiance measurements on the high-resolution optical detector may be used to deduce the 4D radiance on a plane in front of the lenslet array (the input plane). To solve this problem, an accurate statement of the forward problem may be generated by given the radiance $L^{in}(r^{in}, s_\perp^{in})$ on the input plane, compute the irradiance $E^{det}(r^{det})$ on the detector. The forward problem is discussed below analyzed first for a single small lens and then for an array of lenslets. Paraxial approximations are used throughout.

Herein, "4D radiance" refers to a radiance field that is a function of at least four dimensions, e.g., two spatial and two angular dimensions. Hence, a 4D radiance may also refer to a radiance field that depends on a fifth dimension, such as electromagnetic frequency.

Results for a Single Lens with q=f

With the geometry of FIG. 2, the ABCD matrix that models ray propagation from the input plane (i.e., a plane placed in front of the lenslet array) to the output plane (the detector plane) is $$M = M_f M_{lens} = \begin{bmatrix} 1 & f \\ 0 & 1 \end{bmatrix}\begin{bmatrix} 1 & 0 \\ -f^{-1} & 1 \end{bmatrix} = \begin{bmatrix} 0 & f \\ -f^{-1} & 1 \end{bmatrix} \quad (2.1)$$

This analysis also makes use of the inverse $M^{-1}$ of M, which is given by $$M^{-1} = \begin{bmatrix} 1 & -f \\ f^{-1} & 0 \end{bmatrix} \quad (2.2)$$

By conservation of radiance along a ray, the radiance at the input plane and detector plane may be expressed as:

$$L^{in}(r^{in}, s_\perp^{in}) = L^{det}\left(M\begin{bmatrix} r^{in} \\ s_\perp^{in} \end{bmatrix}\right) = L^{det}(fs_\perp^{in}, (s_\perp^{in} - r^{in})/f) \quad (2.3a)$$

$$L^{det}(r^{det}, s_\perp^{det}) = L^{in}\left(M^{-1}\begin{bmatrix} r^{in} \\ s_\perp^{in} \end{bmatrix}\right) = L^{in}(r^{det} - fs_\perp^{det}, r^{det}/f). \quad (2.3b)$$

To get a better understanding of the relationship between $L^{in}(r^{in}, s_\perp^{in})$ and $L^{det}(r^{det}, s_\perp^{det})$, and to test the validity of the expressions above, consider a ray parallel to the optical axis on the left of the lens:

$$L^{in}(r^{in}, s_\perp^{in}) \begin{cases} \neq 0 & \text{if } r^{in} = r_0^{in} \text{ and } s_\perp^{in} = 0, \\ = 0 & \text{otherwise} \end{cases}.$$

Then $L^{det}(r^{det}, s_\perp^{det}) = L^{in}(r^{det} - f s_\perp^{det}, r^{det}/f) \neq 0$ if $$\frac{r^{det}}{f} = 0$$

and $r^{det} - f s_\perp^{det} = r_0^{in}$. This happens when $r^{det} = 0$ and $s_\perp^{det} = -r^{in}/f$, as expected from geometrical optics. Similarly, a ray passing through the front focal point at an angle $r_0^{in}/f$ hits the lens at $r_0^{in}$. Thus $$L^{in}(r^{in}, s_\perp^{in}) \begin{cases} \neq 0 & \text{if } r^{in} = r_0^{in} \text{ and } s_\perp^{in} = r_0^{in}/f, \\ = 0 & \text{otherwise} \end{cases}.$$

Then, $L^{det}(r^{det}, s_\perp^{det}) = L^{in}(r^{det} - f s_\perp^{det}, r^{det}/f) \neq 0$ if $$\frac{r^{det}}{f} = \frac{r_0^{in}}{f}$$

and $r^{det} - f s_\perp^{det} = r_0^{in}$. This gives $r^{det} = r_0^{in}$ and $s_\perp^{det} = 0$, as expected.

With both classical radiance and generalized radiance, the irradiance on a plane P is related to the radiance evaluated on this plane by $$E^P(r) = \int_{hemi} d\Omega_s L^P(r^P, s_\perp^P), \quad (2.4)$$

where the integral runs over a hemisphere of directions for $\hat{s}$, and $d\Omega_s$ is the differential projected solid angle associated with this flux direction. The projected solid angle is the actual solid angle projected onto plane P; if P is perpendicular to the z axis and the usual spherical polar coordinates are used, then the differential solid angle is $d\omega = \sin\theta\, d\theta\, d\phi$ and the differential projected solid angle is $d\Omega = \sin\theta \cos\theta\, d\theta\, d\phi$.

For many problems in optics, including uses of embodiments disclosed herein, radiance does not arrive at point r from a full hemisphere of directions but instead is limited by a lens pupil or some other aperture. Here, the lens under consideration is centered on the optical axis and the observation point $r^{det}$ is on a plane a distance f away. If this observation point is also close to the axis and the F-number of the lens (focal length divided by pupil diameter) is large, then the angle between any ray from the pupil and the optical axis is small, so that $\cos\theta \approx 1$. In this paraxial approximation, the projected solid angle and the solid angle are the same, and (2.4) becomes $$E^{det}(r^{det}) \approx \frac{1}{f^2} \int_{pup} d^2 r^{pup} L^{det}(r^{det}, s_\perp^{set}) \quad (2.5a)$$

where now $s_\perp^{det} \approx (r^{det} - r^{pup})/f$. Note that $r^{pup} = r^{in}$ for a thin lens with the input plane on contact with the lens. Using (2.3a,b) the following results:

$$E^{det}(r^{det}) \approx \frac{1}{f^2} \int_{pup} d^2 r^{pup} L^{det}\left(r^{det}, \frac{r^{det} - r^{pup}}{f}\right) = \quad (2.5b)$$

$$\frac{1}{f^2} \int_{pup} d^2 r^{pup} L^{in}\left(r^{pup}, \frac{r^{det}}{f}\right),$$

which provides a computationally-tractable way to solve the forward problem.

Results for a Single Lens with $q \neq f$

If $q \neq f$, then $$M = \begin{bmatrix} 1 - \frac{q}{f} & -q \\ -f^{-1} & 1 \end{bmatrix}, M^{-1} = \begin{bmatrix} 1 & -q \\ f^{-1} & 1 - \frac{q}{f} \end{bmatrix}$$

As before, $L^{in}(r^{in}, s_\perp^{in})$ and $L^{det}(r^{det}, s_\perp^{det})$ may be related via the matrix M such that $$L^{in}(r^{in}, s_\perp^{in}) = \quad (2.6a)$$

$$L^{det}\left(M\begin{bmatrix} r^{in} \\ s_\perp^{in} \end{bmatrix}\right) = L^{det}((1 - q/f)r^{in} + qs_\perp^{in}, s_\perp^{in} - r^{in}/f),$$

and $$L^{det}(r^{det}, s_\perp^{det}) = \quad (2.6b)$$

$$L^{in}\left(M^{-1}\begin{bmatrix} r^{in} \\ s_\perp^{in} \end{bmatrix}\right) = L^{in}(r^{det} - qs_\perp^{det}, r^{det}/f + (1 - q/f)s_\perp^{det})$$

The same approximations of the previous section are still valid, such that:

$$E^{det}(r^{det}) \approx \frac{1}{q^2} \int_{pup} d^2 r^{pup} L^{det}\left(r^{det}, \frac{r^{det} - r^{pup}}{q}\right) \quad (2.6c)$$

$$= \frac{1}{q^2} \int_{pup} d^2 r^{pup} L^{in}\left(r^{pup}, \frac{r^{det}}{q} + r^{pup}\left(\frac{1}{f} - \frac{1}{q}\right)\right).$$

3 Other Embodiments

To obtain more independent measurements, a scanning mechanism may be added to the lenslet array. For example, the Holographix lenslet array introduced in Sec. 1 may be stepped in 5 μm steps over a 3×3 grid of positions. Since the Canon image sensor may be read out at 9.5 frames per second at full 120 Mp resolution, one may acquire about $10^9$ independent measurements in about one second.

It may also prove useful to use data with a lenslet-to-sensor distance q not equal to the lenslet focal length f. The theory developed herein may be used to select an optimum q.

Collecting data at multiple focal lengths f and fixed q might also be useful. Lenslet arrays described herein may be tunable, such that focal length f of the lenslets may be varied over a large range, e.g., with hydrostatic pressure or electric fields.

In adaptive imaging of x-rays or gamma rays, one makes a rapid acquisition of relatively low-quality images to learn something about the object being imaged. Then the data acquisition protocol of the imaging system or its physical configuration is altered to optimize the final data in terms of the ability to perform a specific task of clinical or scientific importance. All of the theory developed for adaptive imaging with high-energy radiation may be applied to optical imaging with embodiments disclosed herein.

In a photon-processing detector, the position, direction and energy of a single x-ray or gamma-ray photon is estimated in real time as it is detected. By just adding an image intensifier to embodiments disclose herein, embodiments disclosed herein may do the same with visible photons, thereby providing a huge advance in low-light-level imaging.

Note also that embodiments also provide an advantage in low-light-level imaging because there is no need for an objective lens between the object being imaged and the sensor.

4 Applications

Synthetic Imaging Systems

The most general application of a high-fidelity radiance sensor (e.g. systems shown in FIGS. 2 and 4) is to replace optical fabrication and testing with programming. Suppose one wants to build a complicated optical system for imaging or information extraction, and that there are numerous design tradeoffs to be made. It is possible to simply choose an arbitrary plane through the system, insert a high-fidelity radiance sensor in this plane, and ignore all components of the system "downstream" from this plane and all of the associated design tradeoffs. Then one may simulate the missing pieces and compute either the radiance functions elsewhere in the system or the output of some optical detector that would have been part of the real system. All of the missing components may be simulated, either once to select a set of design parameters for a particular input object or light source, multiple times for many different objects, or dynamically as the object evolves in time. As a side benefit, there is no need to include diffraction or vignetting in the synthetic part of the imaging system; the downstream components may have arbitrarily high spatial resolution and throughput.

Reconstruction Algorithms

When the optical system is used to reconstruct an emissive object in 3D, it becomes the optical counterpart of an emission computed tomography system for high-energy radiation, where it is well known that iterative nonlinear reconstructions are very useful. In cone-beam CT, for example, the set of all possible data sets that may be acquired with a given system is a 3D subset of all possible cone-beam projections of a 4D radiance function (see Sec. 17.1 in *Foundations of Image Science*). To choose a different subset, one must build a new imaging system and develop a new algorithm. All such algorithms involve data rebinning, and many of them are iterative enforce nonlinear constraints at each iterative. Since embodiments disclosed herein captures a 4D radiance, or even 5D radiance, on a dense grid of points, the high-resolution radiance sensor may function as a universal data-acquisition system for optical emission computed tomography, and a universal nonlinear reconstruction may be developed.

The forward model developed above may be mathematically formalized as $$g = \mathcal{H} f \quad (2.7a)$$

in which f is a vector in a Hilbert space that represents the object being imaged (for example, the radiance $L^{in}(r^{in}, s_\perp^{in})$ considered above), g represents collected data (for example, a set of numbers obtained by sampling the irradiance $E^{det}$ ($r^{det}$) on a grid of pixel). Eq. (2.7a) is a generalized version of equation 2.6c, and states that if g is a vector $g_m$ of sampled irradiance values, $m \in \{1, 2, \ldots, M\}$, and f is the radiance function $L^{in}$, then g is linked to f by equation 2.6c. Equation (2.7b) define vector $g_m$:

$$g_m \equiv E^{det}(r_m^{det}) \approx \frac{1}{q^2} \int_{pup} d^2 r^{pup} f\left(r^{pup}, \frac{r_m^{det}}{q} + r^{pup}\left(\frac{1}{f} - \frac{1}{q}\right)\right). \quad (2.7b)$$

With this characterization of an imaging system, finding an estimate $\hat{f}$ of f from data g can be stated as finding a pseudoinverse operator $\mathcal{H}^+$ of $\mathcal{H}$. Pseudoinverse operator $\mathcal{H}^+$ may be expressed as a Neumann-series (with infinitely many terms)

$$\mathcal{H}^+ = \lim_{\eta \to 0^+} \sum_{j=0}^{\infty} [(1-\eta)\mathcal{I} - \mathcal{H}^\dagger \mathcal{H}]^j \mathcal{H}^\dagger, \quad (2.8)$$

in which $\mathcal{H}^\dagger$ is the back-projection operator corresponding to $\mathcal{H}$ and $\mathcal{I}$ is an identity operator. The relation in (2.8) suggests that the pseudoinverse operator $\mathcal{H}^+$ is obtained by repeated applications of the projection-back-projection operator $\mathcal{H}^\dagger \mathcal{H}$. A truncated version of the Neumann series can be used as a general reconstruction algorithm. Applying pseudoinverse operator $\mathcal{H}^+$ to both sides of (2.7a) yields f, which may correspond to radiance $L^{in}(r^{in}, s_\perp^{in})$.

The Fifth Dimension

Thus far, it has been assumed that he radiation source is monochromatic. For polychromatic radiation, gratings may be inserted behind the lenslets and take advantage of the enormous number of pixels in the proposed sensor, enabling reconstructions in five dimensions from one or a few exposures. In *Foundations* Chap. 10 it was shown that the most general expression for the mean output of a single pixel in an arbitrary linear optical system viewing a radiance field is given by $$\bar{g}_m = \tau \int_P d^2 r \int_0^\infty d\varepsilon \int_{2\pi} d\Omega d_m(\mathbb{r}, \hat{s}, \varepsilon) L(\mathbb{r}, \hat{s}, \varepsilon), \quad (4.1)$$

where $\tau$ is the exposure time. As discussed above, $\mathbb{r}$ is a general 3D vector, but the spatial integral is over the two variables needed to specify a reference plane P somewhere between the source and detector. Denoting that plane as z=0 and assume that only photons with $s_z \geq 0$ are directed towards the detector, the detector response function may be redefined in 3D by letting $$p_m(\mathbb{r}, \hat{s}, \varepsilon) = \tau d_m(\mathbb{r}, \hat{s}, \varepsilon) \delta(z) \text{step}(s_z), \quad (4.2)$$

and (4.1) becomes $$\bar{g}_m = \int_{\mathbb{r}} d^3 \mathbb{r} \int_0^\infty d\varepsilon \int_{4\pi} d\Omega p_m(\mathbb{r}, \hat{s}, \varepsilon) L(\mathbb{r}, \hat{s}, \varepsilon). \quad (4.3)$$

Embodiments disclosed herein enable complete freedom in the choice of $p_m(r, \hat{s}, \varepsilon)$, in software after the image sensor.

Sensitivity Engineering

Post-processing of radiance data may achieve high system sensitivity on an arbitrarily-shaped region of interest in the 3D object space and reconstruct the object only within the region of interest. Notice that this is a much more powerful procedure than just (a) reconstructing the whole 3D object and (b) setting to zero voxels located outside the region of interest. In fact, by appropriate selection of rays to be used during the reconstruction, blur due to light scattering is reduced. For example, if the reconstruction pertains to the arbitrarily-shaped region of interest, appropriate selection of rays refers to selecting rays that intersect the region of interest.

Synthetic Confocal Microscope

In a conventional wide-field microscope, the entire specimen is flooded evenly in light from a light source. All parts of the specimen in the optical path are excited, which results in a large unfocused background collected by the microscope camera. In contrast, a confocal microscope uses point illumination and a pinhole in an optically conjugate plane in front of the detector to eliminate out-of-focus signal, thus resulting in reduced background and much higher sensitivity than a conventional wide-field microscope. The idea of sensitivity engineering may be applied to implement (in a computer program) the same effect that a confocal microscope achieves via a pinhole aperture meant to block the light coming from out-of-focus planes in object space.

Radiance Detectors for Gamma Cameras

Gamma cameras are used in nuclear medicine to image gamma-ray photons emitted by radioactive isotopes. The main component of a gamma camera is the scintillation crystal. The scintillation crystal converts gamma rays into flashes of visible light, which are then imaged on a fast detector. There is a fundamental trade-off between camera sensitivity and blur in the reconstructions due to parallax errors. A thick scintillation crystal provides high sensitivity but it also requires high accuracy in the estimation of the 3D location at which the gamma ray interacted within the crystal. Accurate depth measurements (i.e., along the dimension perpendicular to the crystal face) are critical to reduce parallax errors. Maximum likelihood algorithms may be used to estimate 3D location within the scintillation crystal from radiance measurements of the (visible) light emitted by the scintillator.

Synthetic Phase Conjugators

Phase conjugation is mathematically equivalent to time reversal. By expressing a monochromatic wave as the real part of a complex amplitude, $U(r, t) = \text{Re}\{\exp[i\phi(r) - i\omega t]\}$, then $U(r, -t) = \text{Re}\{\exp[-i\phi(r) + i\omega t]\}$, because the real part of the complex exponential is a cosine, which is an even function of its argument. Thus, a phase conjugator senses an incoming wave and launches the same wave back where it came from, just as if a movie was run backward.

One application of phase conjugation is to cancel distortion (introduced by, for example, imperfect optics) by letting the (distorted) wave travel through the same distortion-inducing media but it in the reverse direction. Radiance measurements of the distorted wave allow implementation a phase conjugator via a computer program. Applications include compensation for slow-varying speckles in astronomy. (cf. H. H. Barrett and S. F. Jacobs, Retroflective arrays as approximate phase conjugators, *Optics Letters*, Vol. 4, No. 6, p. 190-192, June 1979)

Radiance Sensor

Figure 4:
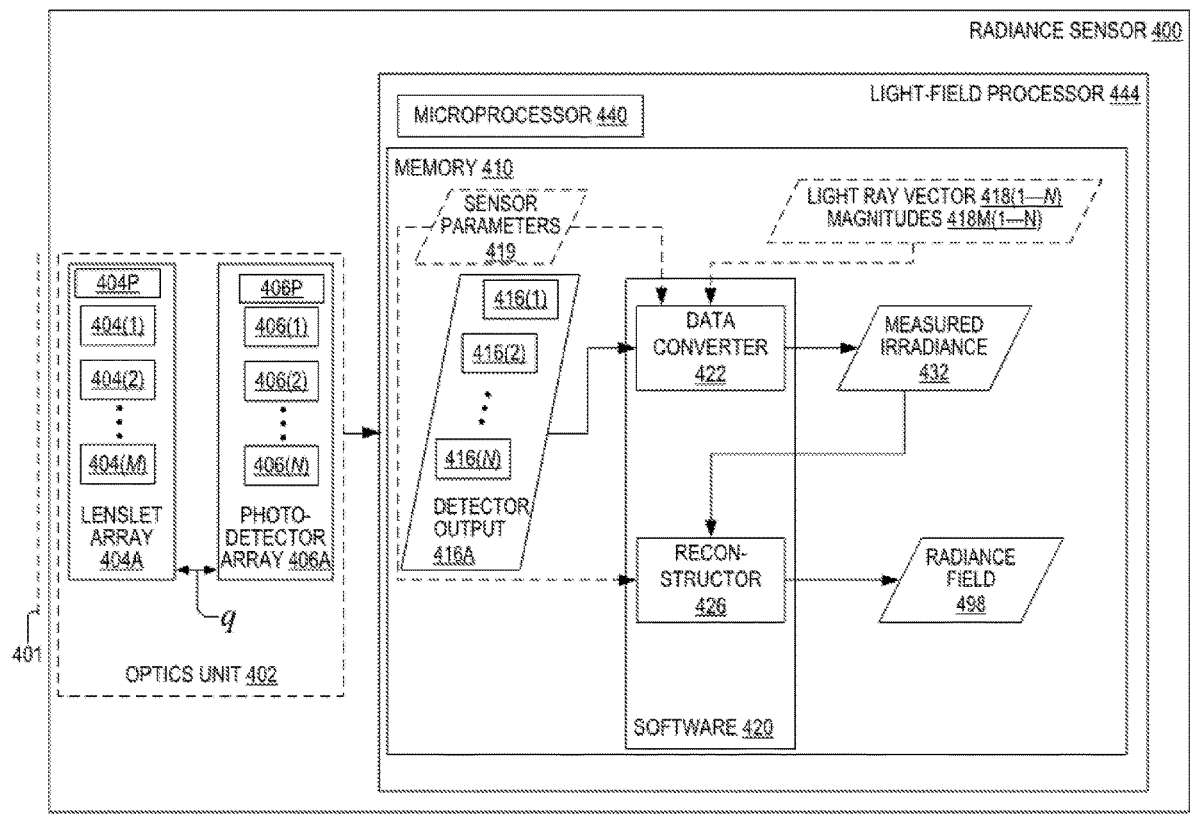
FIG. 4 is a block diagram of a radiance sensor, in an embodiment.

FIG. 4 is a block diagram of a radiance sensor 400. Radiance sensor 400 includes a light-field processor 444 and optionally an optics unit 402. Light-field processor 444 includes a microprocessor 440 and a memory 410 that stores software 420 that includes computer-readable instructions. Optics unit 202 of FIG. 2 is an example of optics unit 402.

Optics unit 402 includes a lenslet array 404A and a photodetector array 406A, which include, respectively, a plurality of lenslets 404(1, 2, . . . , M) and a plurality of photodetectors 406(1, 2, . . . , N), where integer M and N may be unequal. Photodetector array 406A includes N photodetectors, where N may range from ten million to two-hundred million. Photodetector array 406A may be a CMOS image sensor, e.g., one with between ten megapixels and two hundred megapixels. Each lenslet 404 has a focal length f, which is, for example, between 75 μm and 125 μm. Lenslets array 404A may be a planar two-dimensional array in plane 404P that is parallel to an input plane 401. Photodetectors 406 may be arranged in a two-dimensional array in a plane 406P, which may be substantially parallel to plane 404P, e.g., parallel to within ±5°. Planes 401 and 404P may be separated by an infinitesimally small distance. Planes 404P and 406P are separated by a distance q, which may be greater than or equal to focal length f such that lenslets 404 form a real image at plane 406P. For example, f≤q≤10f.

In response to receiving electromagnetic radiation transmitted through lenslet array 404A, photodetector array 406A generates electrical signals, which are then stored in memory 410 as detector output 416A. Detector output 416A includes a plurality of raw irradiance values 416(1-N) each corresponding to an electrical signal generated by a respective photodetector 406(1-N). Each raw irradiance value 416 may be a pixel value, e.g., an integer between zero and $2^8$.

Memory 410 may also store ray vectors 418. Each raw irradiance value 416(1-N) corresponds to one of a plurality of respective electrical signals generated by photodetector 406(1-N). Each photodetector 406 is associated with one respective ray vector 418 transmitted by a lenslet 404 of lenslet array 404A, where the light ray is defined by vectors r≡(x, y) and $s_\perp \equiv (s_x, s_y)$ described above. Each ray vector 418(1-N) is determined, in part, by the position of respective photodetector 406 in photodetector array 406A. Each ray vector 418 has a respective vector magnitude 418M determined by respective raw irradiance value 416. For example, ray vector 418(1) has a vector magnitude 418M(1) determined, at least in part, by a magnitude of raw irradiance value 416(1).

Memory 410 may also store sensor parameters 419. Sensor parameters 419 may include at least one of attributes of lenslet array 404A and photodetector array 406A, such as dimensions, array spacing, and number of lenslets and photodetectors. Sensor parameters 419 may also include photodetector properties such as gain, offset, and saturation.

Software 420 includes the following software modules for producing respective data outputs stored in memory 410. A data converter 422 is configured to generate determined irradiance 432 from detector output 416A and, optionally, also from at least one of ray vectors 418 and sensor parameters 419. A radiance reconstructor 426 is configured to generate a radiance field 498 from determined irradiance 432. Determined irradiance 432 corresponds to $E^{det}$ of equation (2.5b). Radiance field 498 corresponds to $L^{in}(r^{in}, s_\perp^{in})$ of equation (2.3a).

Reconstructor 426 may execute use an iterative method to search for radiance field 498 that is most consistent with the determined irradiance and any known constraints. Reconstructor 426 may determine radiance field 498 such that radiance field 498 is most consistent with determined irradiance 432, per Eq. (2.4) above.

Consistency of radiance field 498 with determined irradiance 432 may be determined by likelihood or squared error between measured and predicted irradiance. Constraints could include positivity of the predicted irradiance or smoothness. Reconstructor 426 may employ one or more methods for solving an inverse problem, such as EM (expectation-maximization), OSEM (ordered subsets), Landweber iteration methods, and other methods known in the art, including those described in Ch. 15 of *Foundations*.

Alternatively, reconstructor 426 may estimate the integrals of the object over a set of long (effectively infinite) cylinders rather than cubic voxels. The relevant mathematical methods described in Clarkson et al. (*Proc. SPIE* 3659, Medical Imaging 1999, doi:10.1117/12.349478) and Wilson et al. (*IEEE Trans Med Imaging*. doi:10.1109/42.870252) and in U.S. Pat. No. 6,392,235, of which column 3:63 through column 7:46, and figures referenced therein, are incorporated herein by reference. In gamma-ray imaging, this approach is called a synthetic collimator, because it synthesizes a 2D image of a 3D object as would be produced by an array of long cylindrical holes bored in a lead block. In embodiments where reconstructor 426 executes this method on incident optical electromagnetic radiation rather than gamma rays, high-fidelity radiance sensor 400 estimates the integral over cylinders of arbitrary length, in which each estimate relatively insensitive to the portions of the object outside a particular cylinder.

Reconstructor 426 may implement at least one of equations (2.7a), (2.7b), and (2.8) to determine radiance field 498. As discussed above, in (2.7a), g may correspond to $E^{det}(r^{det})$ that is, determined radiance 432, while f may correspond to $L^{in}(r^{in}, s_\perp^{in})$, that is, radiance field 498.

Microprocessor 440 may be a digital signal processor such as an image processor. Memory 410 may be transitory and/or non-transitory and may include one or both of volatile memory (e.g., SRAM, DRAM, or any combination thereof) and nonvolatile memory (e.g., FLASH, ROM, magnetic media, optical media, or any combination thereof).

Parameters 219, data converter 222, reconstructor 226, and computing device 244 (FIG. 2) are examples of sensor parameters 419, data converter 422, and reconstructor 426, and light-field processor 444, respectively.

Figure 5:
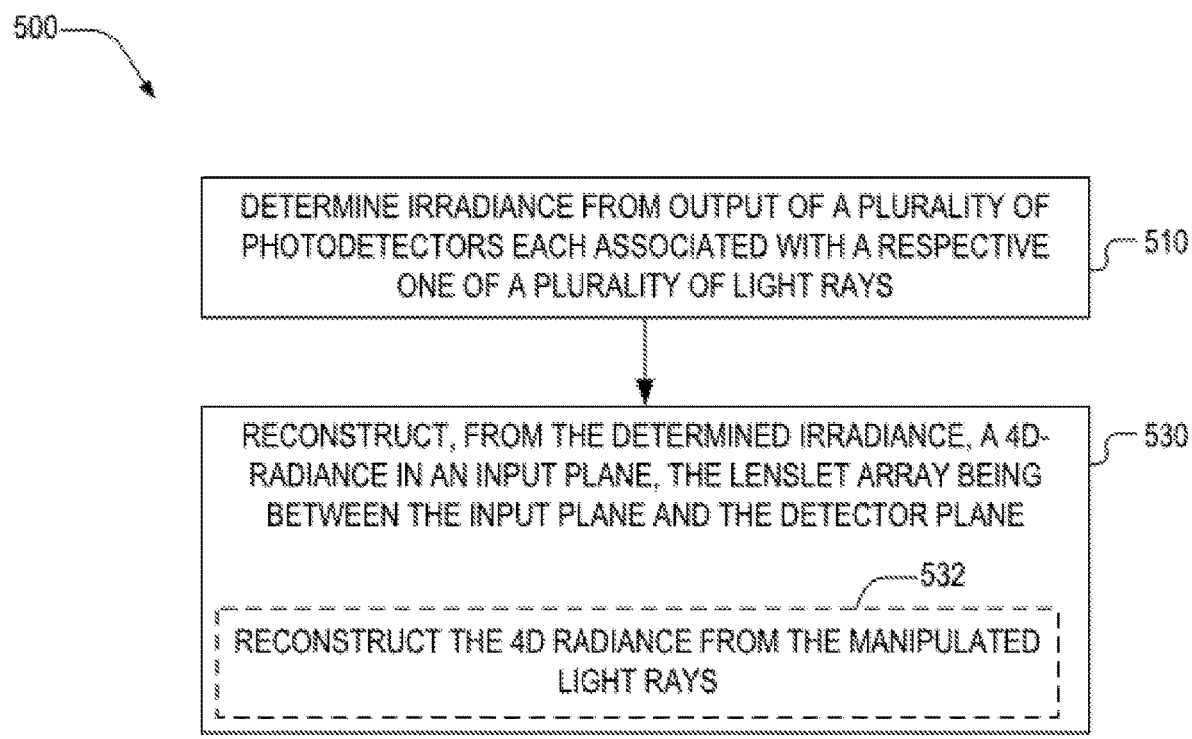
FIG. 5 is a flowchart illustrating a method for reconstructing 4D-radiance of electromagnetic radiation transmitted through a lenslet array and detected by a photodetector array in a detector plane, in an embodiment.

FIG. 5 is a flowchart illustrating a method 500 for reconstructing 4D-radiance of electromagnetic radiation transmitted through a lenslet array and detected by a photodetector array in a detector plane. Method 500 may be implemented within one or more aspects of light-field processor 444. For example, method 500 is implemented by microprocessor 440 executing computer-readable instructions of software 420. FIGS. 4 and 5 are best viewed together in the following description.

In step 510, method 500 estimates irradiance of the light in the detector plane from a plurality of electrical signals, in which each electrical signal had been generated by a respective one of a plurality of photodetectors of the photodetector array. In an example of step 510, data converter 422 estimates irradiance of the electromagnetic radiation in detector plane 406P from raw irradiance values 416. The determined irradiance is saved as determined irradiance 432.

In step 530, method 500 reconstructs, from the determined irradiance, the 4D-radiance in an input plane, the lenslet array being between the input plane and the detector plane. In an example of step 530, reconstructor 426 produces radiance field 498 at least in part from determined irradiance 432. By conservation of radiance, radiance field 498 may be used to compute radiance in any plane parallel to input plane 401.

The above-described systems and methods may be implemented in digital electronic circuitry, in computer hardware, firmware, and/or software. The implementation may be as a computer program product. The implementation may, for example, be in a machine-readable storage device, for execution by, or to control the operation of, data processing apparatus. The implementation may, for example, be a programmable processor, a computer, and/or multiple computers.

A computer program may be written in any form of programming language, including compiled and/or interpreted languages, and the computer program may be deployed in any form, including as a stand-alone program or as a subroutine, element, and/or other unit suitable for use in a computing environment. A computer program may be deployed to be executed on one computer or on multiple computers at one site.

Method steps may be performed by one or more programmable processors executing a computer program to perform functions of the invention by operating on input data and generating output. Method steps may also be performed by and an apparatus may be implemented as special purpose logic circuitry. The circuitry may, for example, be a FPGA (field programmable gate array) and/or an ASIC (application specific integrated circuit). Subroutines and software agents may refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer may include, may be operatively coupled to receive data from and/or transfer data to one or more mass storage devices for storing data (e.g., magnetic, magneto-optical disks, or optical disks).

Data transmission and instructions may also occur over a communications network. Information carriers suitable for embodying computer program instructions and data include all forms of non-volatile memory, including by way of example semiconductor memory devices. The information carriers may, for example, be EPROM, EEPROM, flash memory devices, magnetic disks, internal hard disks, removable disks, magneto-optical disks, CD-ROM, and/or DVD-ROM disks. The processor and the memory may be supplemented by, and/or incorporated in special purpose logic circuitry.

To provide for interaction with a user, the above described techniques may be implemented on a computer having a display device. The display device may, for example, be a cathode ray tube (CRT) and/or a liquid crystal display (LCD) monitor. The interaction with a user may, for example, be a display of information to the user and a keyboard and a pointing device (e.g., a mouse or a trackball) by which the user may provide input to the computer (e.g., interact with a user interface element). Other kinds of devices may be used to provide for interaction with a user. Other devices may, for example, be feedback provided to the user in any form of sensory feedback (e.g., visual feedback, auditory feedback, or tactile feedback). Input from the user may, for example, be received in any form, including acoustic, speech, and/or tactile input.

The above described techniques may be implemented in a distributed computing system that includes a back-end component. The back-end component may, for example, be a data server, a middleware component, and/or an application server. The above described techniques may be implemented in a distributing computing system that includes a front-end component. The front-end component may, for example, be a client computer having a graphical user interface, a Web browser through which a user may interact with an example implementation, and/or other graphical user interfaces for a transmitting device. The components of the system may be interconnected by any form or medium of digital data communication (e.g., a communication network). Examples of communication networks include a local area network (LAN), a wide area network (WAN), the Internet, wired networks, and/or wireless networks.

The system may include clients and servers. A client and a server are generally remote from each other and typically interact through a communication network. The relationship of client and server arises by virtue of computer programs running on the respective computers and having a client-server relationship to each other.

Packet-based networks may include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

The transmitting device may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a web browser (e.g., Microsoft® Internet Explorer® available from Microsoft Corporation, Mozilla® Firefox available from Mozilla Corporation). The mobile computing device includes, for example, a Blackberry®.

Statements Regarding Incorporation by Reference and Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by example embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods may include a large number of optional composition and processing elements and steps.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information may be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" may be used interchangeably herein. It is also to be noted that the terms "comprising", "including", and "having" may be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein may be used in the practice or testing of the present invention, the methods and materials are herein described. Nothing herein is to be construed as an admission that the invention is not entitled to antedate such disclosure by virtue of prior invention.

Every formulation or combination of components described or exemplified herein may be used to practice the invention, unless otherwise stated.

Whenever a range is given in the specification, for example, a temperature range, a time range, or a composition or concentration range, all intermediate ranges and sub-ranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any sub-ranges or individual values in a range or sub-range that are included in the description herein may be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations that are not specifically disclosed herein.

One of ordinary skill in the art will appreciate that starting materials, biological materials, reagents, synthetic methods, purification methods, analytical methods, assay methods, and biological methods other than those specifically exemplified may be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by example embodiments and optional features, modification and variation of the concepts herein disclosed may be resorted to by those skilled in the art, and that such modifications and variations are considered to be within the scope of this invention as defined by the appended claims.

What is claimed is:

1. A method for generating an image from electromagnetic radiation transmitted through a lenslet array and detected by a photodetector array in a detector plane, comprising:
   measuring radiance data of the electromagnetic radiation in the detector plane from a plurality of electrical signals, each of the plurality of electrical signals having been generated by a respective one of a plurality of photodetectors of the photodetector array in response to a respective one of a plurality of spatial regions of the electromagnetic radiation;
   selecting a desired synthetic pupil mask, where the synthetic pupil mask computationally simulates optical effects of one or more optical components on the electromagnetic radiation;
   manipulating the measured radiance data to simulate the optical effects corresponding to the selected synthetic pupil mask, said manipulation comprising applying one or more algorithms or mathematical transformations to the measured radiance data; and
   generating an image from the manipulated radiance data.

2. The method of claim 1, wherein measuring the radiance data comprises determining irradiance of the electromagnetic radiation in the detector plane from the plurality of electrical signals.

3. The method of claim 2, wherein the measured radiance data further comprises 4D-radiance of the electromagnetic radiation in an input plane reconstructed from the determined irradiance.

4. The method of claim 1, wherein the simulated optical effects on the electromagnetic radiation are selected from the group consisting of increasing depth of field, altering magnification, bending of electromagnetic radiation rays, amplitude modulation, sensitivity-function engineering, digital refocusing, aberration correction, aberration reduction, and combinations thereof.

5. The method of claim 1 further comprising generating the image from the manipulated radiance data using maximum likelihood estimation, second order optimization, pseudo-inverse operators, positivity-enforcing operators, or stochastic optimization.

6. The method of claim 1 further comprising measuring the radiance data at multiple focal lengths.

7. The method of claim 1 further comprising the steps of:
estimating optical aberrations caused by the lenslet array and/or photodetector array; and
applying a computational synthetic corrective element to the measured radiance data before selecting the desired synthetic pupil mask, where the synthetic corrective element reduces or corrects the estimated optical aberrations.

8. A system for generating an image of electromagnetic radiation comprising:
a) a lenslet array;
b) a photodetector array located in a detector plane, and including a plurality of photodetectors configured to generate a respective one of a plurality of electrical signals output in response to electromagnetic radiation transmitted by the lenslet array and incident on the photodetector array;
c) memory configured to store non-transitory computer-readable instructions and the plurality of electrical signals;
d) a microprocessor configured to execute the instructions to:
measure radiance data of the electromagnetic radiation in the detector plane from the plurality of electrical signals;
apply one or more algorithms or mathematical transformations to the measured radiance data, where said one or more algorithms or mathematical transformations simulates optical effects of one or more optical components on the electromagnetic radiation; and
generate an image from the manipulated radiance data.

9. The system of claim 8, wherein the microprocessor is able to calculate irradiance of the electromagnetic radiation in the detector plane from the plurality of electrical signals.

10. The system of claim 8, wherein the microprocessor is able to reconstruct 4D-radiance of the electromagnetic radiation in an input plane from the determined irradiance.

11. The system of claim 8, wherein the microprocessor is able to apply a maximum likelihood estimation, second order optimization, pseudo-inverse operator, positivity-enforcing operator, or stochastic optimization to the measured radiance data, manipulated radiance data, or both.

12. The system of claim 8, wherein the simulated optical effects on the electromagnetic radiation are selected from the group consisting of increasing depth of field, altering magnification, bending of electromagnetic radiation rays, amplitude modulation, sensitivity-function engineering, digital refocusing, aberration correction, aberration reduction, and combinations thereof.

13. The system of claim 8, wherein the system does not comprise an objective lens.

\* \* \* \* \*